United States Patent [19]
Mauro et al.

[11] Patent Number: 5,336,328
[45] Date of Patent: Aug. 9, 1994

[54] WHITE WAXY STARCH DEXTRINS FOR USE IN ADHESIVES

[75] Inventors: David Mauro, Dolton, Ill.; Ronald Kozlowski, Hammond; Larry Benko, Schererville, both of Ind.

[73] Assignee: American Maize Technology, Inc., Dimmitt, Tex.

[21] Appl. No.: 788,257

[22] Filed: Nov. 5, 1991

[51] Int. Cl.⁵ .................................................. C08L 3/02
[52] U.S. Cl. ........................................ 127/33; 127/71; 106/205; 106/210
[58] Field of Search ................. 106/205, 210; 127/33, 127/71

[56] References Cited

U.S. PATENT DOCUMENTS

| | | | |
|---|---|---|---|
| 642,329 | 1/1900 | Higgins | 106/205 |
| 1,937,752 | 12/1933 | Fuller | 127/39 |
| 1,942,544 | 1/1934 | Fuller | 127/38 |
| 1,956,064 | 4/1934 | Edson | 106/210 |
| 2,115,157 | 4/1938 | Bulfer et al. | 106/205 |
| 2,317,752 | 4/1943 | Fuller | 127/33 |
| 2,354,838 | 8/1944 | Schopmeyer et al. | 127/33 |
| 3,224,903 | 12/1965 | Commerford et al. | 127/38 |
| 3,527,606 | 9/1970 | Taylor et al. | 127/71 |
| 4,549,909 | 10/1985 | Samuel et al. | 127/33 |
| 4,806,377 | 2/1989 | Ellis et al. | 426/549 |

*Primary Examiner*—David Brunsman
*Attorney, Agent, or Firm*—Lucas & Just

[57] ABSTRACT

A white waxy corn starch dextrin produces a paste of excellent color and clarity when compared to waxy corn starch dextrins without the need for bleaching.

9 Claims, No Drawings

WHITE WAXY STARCH DEXTRINS FOR USE IN ADHESIVES

This invention relates to adhesives and, more particularly, to the use of a white waxy corn starch dextrin in an adhesive. The paste made from the white waxy corn starch dextrin exhibits excellent color and viscosity stability as well as good clarity compared to conventional waxy corn starch dextrins.

Dextrins are well-known starch degradation products extensively used in industry in mucilage, adhesives and in adhesive formulations as for example on stamps and envelopes. Industrial dextrins are characterized as canary dextrins, cream dextrins, white dextrins and British gums.

Degradation of starch to dextrins is conventionally obtained by heating starch alone or by heating starch in the presence of an acid or catalyst. In all cases the starch molecules are reduced in size to the selected degree to provide a relatively fast drying adhesive with good tack. Dextrinization is an art and each manufacturer has its own particular procedures. The degree of degradation of the starch molecules depends on the temperature employed, speed of heating, the time of holding the starch at the selected temperature, and the type and amount of acid or catalyst that is used in the selected dextrinization process.

Dextrins and British gums are typically prepared by heating starch containing about 12.0% moisture content by weight to a temperature of about 200° F. to about 360° F. or more for a period of time that may range from two to ten and more hours depending on the desired degree of degradation. As a practical matter, degradation of the starch is carried out to the extent that at least about 30% by weight of the dextrinized dry product will be soluble in water. The acid customarily used is hydrochloric acid that is sprayed on the dry starch in an amount of up to about 0.04% hydrochloric acid by weight of starch. Higher amounts of hydrochloric acid may be used in conventional manner and any of the known conventional acids or catalysts such as sodium bicarbonate, sodium phosphate or chlorine gas at a neutral or alkaline pH may be employed.

Root starches and in particular potato and tapioca conventionally provide canary dextrins which in solution have excellent clarity and stability even at concentrations up to 65% by weight of dry solids in water. Canary dextrins derived from waxy corn starch in conventional manner tend to give hazy solutions that do not possess the luster of dextrins derived from potato or tapioca starches. In order to overcome this problem, U.S. Pat. No. 4,549,909 disclosed the use of dextrins from waxy corn starch that give aqueous solutions possessing excellent clarity, luster and stability. These dextrins were prepared by pretreating the waxy starch with sodium or calcium hypochlorite. The pretreatment bleaching is carried out in controlled manner to provide only mild oxidation which in some way tenderizes or so preconditions the waxy starch that it is readily dextrinized. The resulting waxy starch dextrins provide excellent clarity, luster and stability in aqueous solutions containing up to 65% solids. This was quite unexpected since oxidized starches are known to be sensitive to heat and rapidly turn brown upon heating.

One of the drawbacks of the waxy dextrin of the '909 patent is that it must be double treated, bleached and then dextrinized. Such double treatment is more time-consuming and costly.

Additionally, the dextrin of the '909 patent is classified as a modified starch product by the U.S. Food and Drug Administration. This is a drawback when used in an adhesive applied to an envelope. Such adhesives are typically moistened by simply licking the adhesive prior to sealing the envelope. There is a general trend by consumers to seek a natural product which is devoid of ingredients such as modified starch.

A waxy corn starch dextrin has now been discovered which does not fall under the category of a modified corn starch product and which possesses good clarity and color and viscosity stability when compared to conventional waxy corn starch dextrins in aqueous solutions. Such a waxy dextrin is made by employing a waxy starch which is obtained from maize that is homozygous with the white (w) and waxy (wx) recessive genes. In other words, the starch is obtained from maize that is wwx homozygous genotype. In order to make the white waxy corn starch dextrin of the present invention, a white waxy corn starch is treated with an acid and cooked at a temperature between about 200° F. and 350° F. for a period of about 2 to about 10 hours. The dextrin of the present invention is made from non-bleached white waxy corn starch.

The term white waxy or wwx genotype as used in the specification and claims means not only the wwx homozygous genotype, wwwxwx, which has been obtained by standard plant breeding techniques but also the wwx genotype which has been moved to another portion of the plant genome by translocation, inversion or any other method of chromosome engineering to include variations thereof whereby the disclosed properties of the starch of the present invention are obtained.

The waxy gene is reported to be located on chromosome 9 of the maize chromosomes and the white gene is reported to be located on chromosome 6. See "Development Genetics", Volume 5, pages 1-25, 1984.

Generally, to obtain a starch-bearing plant with both double recessive mutants of the w and wx genotype, a plant of a w mutant is crossed with a plant having a wx mutant and thereafter inbred to obtain a plant homozygous in wwx. After the homozygous wwx genotype is obtained, standard breeding techniques are used to obtain hybrid vigor. Hybrids are preferred because of their high starch yield compared to inbred lines. The method of crossing plants and of obtaining specific genotypes in the offspring as well as breeding to obtain hybrid vigor is well-known.

White waxy starch is extracted from maize which is a wwx homozygous genotype in a conventional manner. Good results have been obtained by wet milling. Normally, the starch obtained from a wet milling operation is in a slurry. The white waxy starch is preferably recovered from the slurry and dried.

Suitable catalysts for use in roasting the white waxy starch include hydrochloric acid, nitric acid, monochloroacetic acid, phosphoric acid, and chlorine. Hydrochloric acid is preferred. The amount of acid used is such to bring the pH of the starch to about 3.0.

Any of the conventional roasting apparatus may be used such as the known bulk cookers, fluidized bed dextrinizers or kiln type cookers. U.S. Pat. No. 3,200,012 describes one form of cylindrical drum roaster and U.S. Pat. No. 3,527,606 describes a paddle type roaster which may be conveniently employed for dextrinizing the pretreated waxy starch. Roasting temperature may range from about 200° F. up to 350° F. and more depending on the type of roaster employed for a period of time of from about 2 up to about 10 hours to obtain a dextrin of desired viscosity. In accordance with the present invention, the final white waxy starch dextrin will dissolve in water upon heating to 190° F. (90° C.) to provide a solution containing at least 30% solids and excellent clarity and luster.

In one specific example, dried white waxy corn starch is treated with gaseous hydrochloric acid to bring the pH of the white waxy corn starch to about 3.0. The acidified white waxy corn starch was roasted in a horizontal cooker at 335° F. for about 2–3 hours. The resulting canary white waxy corn starch dextrins readily dissolved in cold water at about 10% solids (dry basis) and the solution had luster and excellent clarity.

It has been found that the white waxy corn starch of the present invention produced an aqueous solution at 4% by weight with a transmittance from 60% to 85% of light at a measurement of 500 m$\mu$ to 800 m$\mu$ through a 1 cm cell. More specifically, it has been found that a solution of 4% by weight of white waxy corn starch dextrin of the present invention has a light transmittance over 75% T when measured spectrophotometrically at 728 m$\mu$ in a 1 cm cell at 40% solids. These measurements are at ambient temperatures.

In contrast, a test solution of the pretreated waxy corn starch as taught in the '909 patent containing 4% solids by weight transmitted from 73% to 95% of light in the visible spectrum from 500 m$\mu$ to 800 m$\mu$ through a 1.0 centimeter cell when measured in a conventional spectrophotometer and conventional waxy corn starch dextrins transmit only about 48% to 64% of light under the same test conditions.

It is important for clarity of aqueous solutions to carry out dextrinization of the white waxy corn starch at a pH not greater than about 3.5. It has been found that dextrinization of the white waxy starch proceeds rapidly at the specified low pH and there is no tendency for the white waxy corn starch dextrin to take on an objectionable color or lose clarity as is likely to occur when the white waxy corn starch is roasted for the long period of time required when the pH is above about 3.5.

For the purposes of long term viscosity stability, it is important to carry out the dextrinization at a temperature above about 300° F. (150° C.).

The dextrinization of the white waxy corn starch may be carried out in conventional manner at the specified pH to produce any of the conventional dextrins such as the white dextrins, canary dextrins, cream dextrins or British gums. In general, the Brookfield viscosity of these dextrins using a No. 4 spindle at 20 r.p.m. will be from about 1000 to 9000 cps. at a solids level of about 50 to 60% and the dextrin will possess a reducing sugar content below about 6.0%. Dilute (1.5–2.0N) hydrochloric acid used in an amount of up to about 0.04% by weight of starch will, in general, provide the specified pH of below about 3.5 for dextrinizing the white waxy corn starch of the present invention.

These and other aspects of the present invention may be more fully understood by reference to the following examples:

EXAMPLE 1

This example illustrates making a white waxy corn starch dextrin in accordance with the present invention and the viscosity stability of the dextrin.

One hundred (100) pounds of a white waxy corn starch was loaded into a Littleford converter (a horizontally oriented cooker) and 11.93 grams of hydrogen chloride gas was added to lower the pH to 2.75. The moisture level of the starch was initially 10.2% by weight. A sample, Sample 1-A, was removed after three hours and another sample, Sample 1-B, was removed after three hours and twenty minutes. The temperature control on the cooker was set to the maximum (340° F.) and it took two and one-half hours to reach that temperature.

Each dextrin sample was slurried in water to about 60% solids and 0.144 grams of Dowicil ® was added to control bacterial growth. The viscosity stability as well as the color stability of these two samples are illustrated in Table 1 below.

TABLE 1

| Day | Sample 1-B Viscosity (cps) | Sample 1-A Viscosity (cps) |
| --- | --- | --- |
| 0 | 3170 | 3770 |
| 1 | 3700 | 4410 |
| 2 | 3640 | 3800 |
| 3 | 3400 | 4060 |
| 7 | 3440 | 4090 |
| 15 | 3400 | 4200 |
| 21 | 3670 | 4190 |
| 30 | 3540 | 4320 |
| 35 | 3700 | 4540 |
| 43 | 3600 | 4370 |
| 50 | 4100 | 5160 |
| 56 | 3900 | 5150 |

In both samples, the color was gold and remained stable throughout the tests. Sample 1-B had better stability than Sample 1-A.

The temperature of each sample was maintained at ambient (about 70° F.) throughout the test. The viscosity was measured using a Brookfield viscometer with a No. 4 spindle at 20 r.p.m.

EXAMPLE 2

This example illustrates making the white waxy dextrin of the present invention using double the acid and a shorter reaction time.

In this example the same reaction vessel was used with 20.13 grams of hydrogen chloride gas. The pH was 2.45. The moisture level of the starch initially was 9.8% by weight. A sample, Sample 2-A, was removed from the cooker after two hours while another sample, Sample 2-B, was removed after two and one-half hours. As with Example 1, the temperature control on the cooker was set at the Maximum. By two hours, the contents of the cooker reached 333° F. while a half hour later it had reached 340° F.

Pastes were made up of each sample as in Example 1 and each paste was tested over time as in Example 1. The results are reported in Table 2 below.

TABLE 2

| Day | Viscosity (cps) Sample 2-A | Day | Viscosity (cps) Sample 2-B |
| --- | --- | --- | --- |
| 0 | 2590 | 0 | 2265 |
| 1 | 2480 | 1 | 2650 |
| 2 | 2575 | 2 | 2285 |
| 7 | 2740 | 3 | 2450 |
| 14 | 2590 | 7 | 2520 |
| 21 | 2630 | 15 | 2530 |
| 29 | 2850 | 21 | 2540 |
| 34 | 2780 | 30 | 2545 |
| 42 | 2630 | 35 | 2600 |
| 49 | 3020 | 44 | 2450 |

TABLE 2-continued

| Day | Viscosity (cps) Sample 2-A | Day | Viscosity (cps) Sample 2-B |
|---|---|---|---|
| 55 | 2750 | 50 | 2680 |
|  |  | 56 | 2540 |

As with Example 1, each paste was stored at ambient temperature (about 70° F.). Each sample was dark brown in color and remained so throughout the test period.

EXAMPLE 3

This example illustrates the importance of converting the starch to a dextrin at a temperature above 300° F. (150° C.) in order to get long term viscosity stability.

Using the reaction vessel of Example 1, one hundred pounds of a white waxy corn starch is converted to a dextrin using 20.15 grams of hydrogen chloride gas. The pH of the contents was 2.43 and the starch had a moisture content of 10.3% by weight. The reaction was carried out for four hours. The temperature control on the cooker was set to go up to about 265° F, which it reached after one and one-half hours of cooking.

The viscosity of this product is reported below.

TABLE 3

| Day | Spindle | Viscosity (cps) |
|---|---|---|
| 0 | 3 | 2,930 |
| 1 | 3 | 3,510 |
| 2 | 3 | 3,550 |
| 7 | 4 | 6,890 |
| 14 | 5 | 8,140 |
| 21 | 5 | 9,200 |
| 29 | 5 | 10,100 |
| 34 | 5 | 9,800 |
| 42 | 5 | 10,080 |
| 49 | 5 | 10,500 |
| 56 | 5 | 9,980 |

The paste was prepared and tested in the same manner as in Examples 1 and 2 except three different spindles were used as indicated.

The color of the paste was light gold and the color remained the same throughout the test period. However, as noted, the viscosity did not remain stable over a long period of time. This lack of long term stability is due to the low conversion temperature.

It will be understood that it is intended to cover all changes and modifications of the preferred embodiment of the invention herein chosen for the purpose of illustration which do not constitute a departure from the spirit and scope of the invention.

What is claimed is:

1. In a process for manufacturing a waxy corn starch dextrin, the improvement which comprises:

roasting a white waxy corn starch at a temperature between about 300° F. and 350° F. at a pH of not over 3.5 to convert the white waxy corn starch to a dextrin which when added to water in an amount of about 4% by weight produces a solution which has a transmittance from 60% to 85% of light when measured spectrophotometrically at 500 m$\mu$ to 800 m$\mu$ through a 1 cm cell and a long term viscosity stability.

2. A white waxy corn dextrin produced by the process of claim 1 and having a Brookfield viscosity from about 1000 to about 9000 cps.

3. A white waxy corn dextrin produced by the process of claim 1.

4. A white waxy corn dextrin produced by the process of claim 1 and having an aqueous solution capable of transmitting over 75% of light when measured spectrophotometrically at 728 m$\mu$ through a 1 cm cell in a 4% by weight test solution.

5. The process of claim 1 wherein the white waxy corn starch is treated with hydrochloric acid to adjust the pH of the starch to about 3.0 for roasting.

6. The process of claim 5 wherein the roasting is carried out at a temperature of about 335° F. for a period of about 2 to 3 hours.

7. A white waxy corn dextrin produced by the process of claim 5.

8. The process of claim 1 wherein the roasting is carried out at a temperature of about 335° F. for a period of about 2 to 3 hours.

9. A white waxy corn dextrin produced by the process of claim 8.

* * * * *

UNITED STATES PATENT AND TRADEMARK OFFICE
CERTIFICATE OF CORRECTION

PATENT NO. : 5,336,328
DATED : August 9, 1994
INVENTOR(S) : David Mauro et al.

It is certified that error appears in the above-identified patent and that said Letters Patent is hereby corrected as shown below:

Column 3, line 25, change "40%" to --4%--.

Column 6, line 18 (claim 1), after "and" delete "a".

Signed and Sealed this

Twenty-fifth Day of October, 1994

Attest:

Attesting Officer

BRUCE LEHMAN
Commissioner of Patents and Trademarks